(12) United States Patent
Taniguchi et al.

(10) Patent No.: US 7,209,862 B2
(45) Date of Patent: Apr. 24, 2007

(54) SELF-DIAGNOSING SYSTEM FOR ENCODER

(75) Inventors: Mitsuyuki Taniguchi, Gotenba (JP); Hirofumi Kikouchi, Minamitsuru-gun (JP); Hajime Miyamoto, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 8 days.

(21) Appl. No.: 11/049,079

(22) Filed: Feb. 3, 2005

(65) Prior Publication Data

US 2005/0171713 A1 Aug. 4, 2005

(30) Foreign Application Priority Data

Feb. 3, 2004 (JP) ............... 2004-026946

(51) Int. Cl.
*G05B 11/26* (2006.01)

(52) U.S. Cl. .................. 702/183; 702/81; 702/84; 702/63; 318/592; 318/602; 700/13; 700/113

(58) Field of Classification Search .................. 702/63, 702/81, 84, 183; 318/592, 602, 432, 434, 318/446–470, 568.22, 610, 632, 685, 815; 700/13, 113
See application file for complete search history.

(56) References Cited

U.S. PATENT DOCUMENTS

| | | | | |
|---|---|---|---|---|
| 4,315,200 A | * | 2/1982 | Yamada et al. | 318/603 |
| 4,575,666 A | * | 3/1986 | Nakashima et al. | 318/661 |
| 4,647,827 A | * | 3/1987 | Toyoda et al. | 318/592 |
| 5,555,347 A | * | 9/1996 | Yoneda et al. | 700/247 |
| 5,621,289 A | * | 4/1997 | Doyama | 318/432 |
| 5,744,926 A | * | 4/1998 | Lai et al. | 318/590 |
| 5,886,491 A | * | 3/1999 | Yoshida et al. | 318/592 |
| 6,456,025 B2 | * | 9/2002 | Berkowitz et al. | 318/272 |
| 6,812,668 B2 | * | 11/2004 | Akiyama | 318/610 |
| 2002/0151988 A1 | * | 10/2002 | Shiba et al. | 700/13 |
| 2003/0128002 A1 | * | 7/2003 | Kokubo et al. | 318/268 |
| 2003/0137270 A1 | * | 7/2003 | Sano | 318/625 |
| 2003/0178958 A1 | * | 9/2003 | Akiyama | 318/280 |

FOREIGN PATENT DOCUMENTS

JP 1-143297 10/1989
JP 3183427 4/1994

* cited by examiner

*Primary Examiner*—Carol S. W. Tsai
(74) *Attorney, Agent, or Firm*—Drinker Biddle & Reath LLP (57) ABSTRACT

A self-diagnosing system for an encoder. The system includes an encoder circuit for outputting information detected by an encoder; a data preparing section provided in the encoder circuit and preparing data representing a state of an abnormal-state judgment factor in connection with at least one of the encoder and an electric motor combined with the encoder; a signal generating section provided in the encoder circuit and generating an abnormal-state signal when the data prepared in the data preparing section represents an abnormal state of the abnormal-state judgment factor; and a storage section provided in the encoder circuit and storing the data representing a state of the abnormal-state judgment factor when the signal generating section generates the abnormal-state signal. The storage section may store the data prepared in the data preparing section at a desired timing not later than the instant the signal generating section generates the abnormal-state signal.

6 Claims, 5 Drawing Sheets

SELF-DIAGNOSING SYSTEM FOR ENCODER

BACKGROUND OF THE INVENTION

1. Field of the Invention

The present invention relates to an encoder for detecting the position and/or speed of an electric motor and, more particularly, to a self-diagnosing system for an encoder, which detects by a self-diagnosis the occurrence of a malfunction or abnormal state during operation of the electric motor.

2. Description of the Related Art

As is generally known, an encoder is widely used to detect, e.g., the position and/or speed of a servomotor that drives an axis (i.e., a control axis) of a machine tool or an industrial robot. In this configuration, a malfunction or abnormal state often occurs in the encoder itself or the electric motor due to various internal or external factors. Therefore, it has been conducted that the encoder performs a self-diagnosis on whether a malfunction or abnormal state has occurred in connection with a predetermined check item, and that, when the result of the self-diagnosis is obtained as to indicate the occurrence of a certain malfunction or abnormal state, the encoder transmits or transfers the result of the self-diagnosis to a control unit of the axis as alarm information. In this case, the alarm information transferred to the control unit is used for a maintenance service, such as a root cause analysis of the occurrence of the abnormal state.

However, the data (i.e., the alarm information) transferred from the encoder to the control unit is often insufficient to be used to elucidate the cause of the abnormal state occurring in the encoder or the electric motor, because of a limit in the data transferring capacity. In other words, the output from the encoder, as the alarm information transferred to the control unit when the abnormal state occurs, is generally only one self-diagnosis result concerning a check item showing the abnormal state (which means that one abnormal-state judgment factor shows the abnormal state), or the logical sum of a plurality of diagnosis results concerning the check item (which means that at least one abnormal-state judgment factor shows the abnormal state). Therefore, it is generally difficult to elucidate satisfactorily the cause of the abnormal-state occurrence, by using only the alarm information displayed or stored in the control unit.

In the case where an encoder falling into an abnormal state is replaced with another one and, at a later date, a specialty division investigates the cause of the abnormal state occurring in this encoder, the encoder sometimes does not manifest the phenomenon of the abnormal state when the encoder is operated again. In this case, the elucidation or cause of the abnormal-state occurrence becomes more difficult.

It has been conventionally known that a storage section for storing information required to control an electric motor is incorporated into the encoder. For example, Japanese Utility Model Publication (Kokai) No. 1-143297 (JP-U-01-143297) discloses a servomotor with encoder, including a storage section for storing inherent information corresponding to the type of a servomotor. The storage section provided in this servomotor with encoder is used to store inherent information, such as identification (ID) information of the servomotor (such as specification data, date of manufacture, the serial number of the unit motor, etc.), and detection-precision correction data of the encoder. However, the storage section does not store internal information on the encoder (i.e., data indicating an abnormal state) at the instant a malfunction or abnormal state occurs in the encoder or the servomotor.

On the other hand, Japanese Patent Publication No. 3183427 (JP-B-3183427) discloses an abnormal-state detecting system, in which a storage section for storing data (i.e., alarm information) indicating an abnormal state at the instant an abnormal state occurs in the electric motor is incorporated into an encoder. This abnormal-state detecting system is not a self-diagnosing system, but one in which a driver (i.e., a control unit) detects an abnormal-state in the electric motor. When an abnormal-state is detected, the driver interrupts the power supply to the electric motor, and transmits alarm information indicating the motor malfunction to the encoder. Then, the storage section provided in the encoder stores the alarm information transmitted from the driver. The alarm information stored in the storage section can be read out through the driver, or through a suitable reading unit in a case where the driver is omitted.

SUMMARY OF THE INVENTION

It is an object of the present invention to provide a self-diagnosing system for an encoder, for detecting, by self-diagnosis, the occurrence of an abnormal state during the operation of an electric motor, which has both excellent maintenance characteristics and reliability, and in which it is possible to output information indicating the abnormal state to an external control unit, to confirm the operation state of the electric motor or the encoder at the instant of occurrence of the abnormal state at a desired timing after outputting the information, and thereby to easily and accurately specify the cause of the abnormal-state occurrence.

In order to achieve the above object, the present invention provides a self-diagnosing system for an encoder, comprising an encoder circuit for outputting information detected by an encoder; a data preparing section provided in the encoder circuit, the data preparing section preparing data representing the state of an abnormal-state judgment factor in connection with at least one of the encoder and an electric motor combined with the encoder; a signal generating section provided in the encoder circuit, the signal generating section generating an abnormal-state signal when the data prepared in the data preparing section represents an abnormal state of the abnormal-state judgment factor; and a storage section provided in the encoder circuit, the storage section storing the data representing a state of the abnormal-state judgment factor when the signal generating section generates the abnormal-state signal.

In the above configuration, the storage section may store the data prepared in the data preparing section at a desired timing not later than the instant the signal generating section generates the abnormal-state signal.

Also, the data preparing section may prepare plural pieces of data respectively representing states of plural abnormal-state judgment factors set in connection with predetermined check items for the at least one of the encoder and the electric motor; the signal generating section may generate the abnormal-state signal when at least one of the plural pieces of data prepared in the data preparing section represents an abnormal state in the abnormal-state judgment factor corresponding thereto; and the storage section may store the plural pieces of data respectively representing states of the plural abnormal-state judgment factors when the signal generating section generates the abnormal-state signal.

The data prepared in the data preparing section may include at least one of data representing the state of the abnormal-state judgment factor in terms of the position of the electric motor detected by the encoder; data representing the state of the abnormal-state judgment factor in terms of the speed of the electric motor detected by the encoder; data representing the state of the abnormal-state judgment factor in terms of the temperature of the encoder; and data representing the state of the abnormal-state judgment factor in terms of the temperature of the electric motor.

The storage section may further store evidential data representing evidence of generation of the abnormal-state signal, when the signal generating section generates the abnormal-state signal, the evidential data being used as a basis of the data prepared in the data preparing section.

The self-diagnosing system having the above configuration may further comprise a moving-distance measuring section provided in the encoder circuit, the moving-distance measuring section measuring the accumulated total moving distance of the encoder; and the storage section may further store the accumulated total moving distance measured in the moving-distance measuring section when the signal generating section generates the abnormal-state signal.

Also, the self-diagnosing system having the above configuration may further comprise an operating-time measuring section provided in the encoder circuit, the operating-time measuring section measuring the accumulated total operating time of the encoder; and the storage section may further store the accumulated total operating time measured in the operating-time measuring section when the signal generating section generates the abnormal-state signal.

BRIEF DESCRIPTION OF THE DRAWINGS

The above and other objects, characteristics, and advantages of the present invention will become more apparent from the following description of preferred embodiments in connection with the accompanying drawings. In the accompanying drawings.

DETAILED DESCRIPTION

The embodiments of the present invention are described below in detail, with reference to the accompanying drawings. In the drawings, the same or similar components are denoted by common reference numerals.

Figure 1:
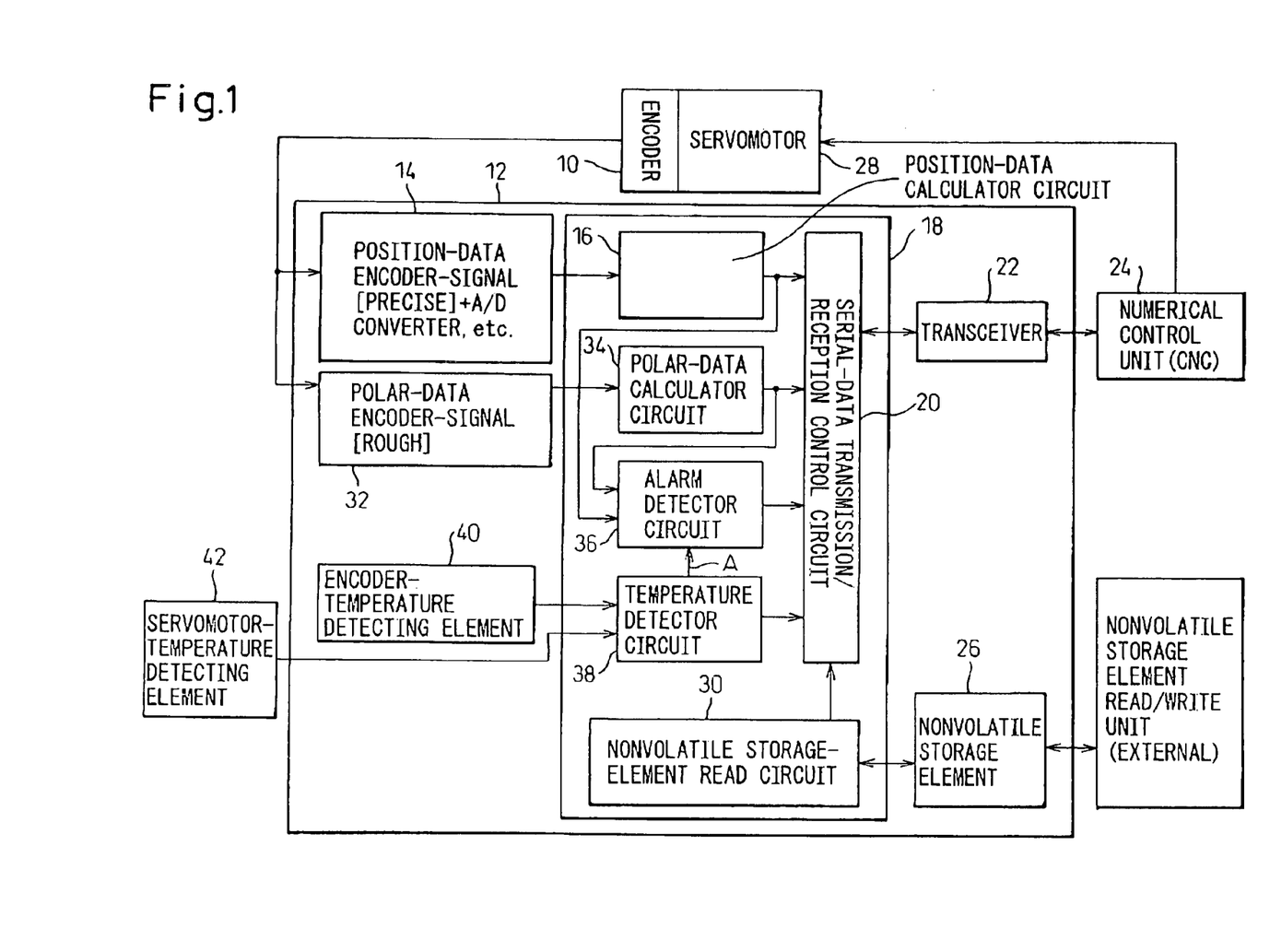
FIG. 1 is a circuit block diagram showing the configuration of a self-diagnosing system for an encoder, according to a related art of the present invention.

First, a self-diagnosing system for an encoder, as a related art of the present invention, is described with reference to FIG. 1. As illustrated, in this self-diagnosing system, an encoder circuit 12 for outputting information detected by an encoder 10 is provided with an encoder-signal amplifier circuit for position-data 14 incorporating therein an analog-to-digital (A/D) converter or the like, and a position-data calculator circuit 16 connected to the encoder-signal amplifier circuit for position-data 14. The encoder-signal amplifier circuit for position-data 14 is an analog signal circuit for amplifying signals of various phases (A-phase, B-phase, Z-phase, etc.), which are generated when an optical code plate (not shown) of the encoder 10 performs a rotation (in the case of a rotary encoder) or a linear motion (in the case of a linear encoder). The signal amplified in the encoder-signal amplifier circuit 14 is subjected to processes such as an A/D conversion, and thereafter is input to the position-data calculator circuit 16. The position-data calculator circuit 16 is a circuit for calculating the position (i.e., the rotation position or linear notion position) on the basis of a known calculation process, and constitutes a part of a logic circuit 18 comprised of a large-scale integration (LSI) provided in the encoder circuit 12.

The position data calculated by the position-data calculator circuit 16 are input sequentially to a transceiver 22 through a serial-data transmission/reception control circuit 20 provided in the logic circuit 18, in the same way as outputs from other circuits, and are transmitted from the transceiver 22 to a numerical control unit (CNC) 24. The numerical control unit (CNC) 24 carries out a feedback control or the like, on the basis of these position data. In this connection, the position data sent to the numerical control unit (CNC) 24 are corrected or processed, as occasion demands, using data stored in a nonvolatile storage element 26 provided in the encoder circuit 12. The nonvolatile storage element 26 stores ID information (such as specification data, date of manufacture, the serial number of a unit motor, etc.) of the encoder 10 and a servomotor 28, precision correction data for ensuring the detection precision of the encoder 10, and so on. These data are read by a nonvolatile storage-element read circuit 30 provided in the logic circuit 18, and are used for the calculation (e.g., correction of an error inherent to individual encoders 10) executed in the numerical control unit 24. In the case where speed data is required, the position-data calculator circuit 16 may be changed to a "position data and speed data calculator circuit" for preparing the speed data within the encoder circuit 12, or alternatively, the numerical control unit 24 may prepare the speed data on the basis of the position data.

The encoder 10 is required in order to detect a position in high precision as far as possible, so that the encoder-signal amplifier circuit for position-data 14 handles a signal having extremely high precision, which is denoted by a suffix [precise] in the drawing. In addition to the circuit 14 for highly precise detection of the position information, the encoder circuit 12 is provided with an amplifier circuit 32 for outputting an encoder signal for polar-data (which is denoted by a suffix (rough) in the drawing), as a signal representing the position of the motor axis with relatively low precision (i.e., a precision defined by the performance of a rotary encoder sufficient to detect an actual rotation number; or a precision defined by the performance of a linear encoder sufficient to detect a position within one polar-cycle error). The encoder signal for polar-data, output from the amplifier circuit 32, is input to a polar-data calculator circuit 34 in the logic circuit 18. A result of the calculation in the calculator circuit 34 is sent to the numerical control unit (CNC) 24 through the serial-data transmission/reception control circuit 20 and the transceiver 22, in the same way as outputs from other circuits, and is used for, e.g., detection of the total rotation number of the encoder 10 or the servomotor 28 (in the case of a linear encoder, the total moving distance of the encoder 10 or the linear servomotor 28).

The logic circuit 18 comprised of the LSI includes an alarm detector circuit 36 and a temperature detector circuit 38, in addition to the position-data calculator circuit 16, the polar-data calculator circuit 34 and the nonvolatile storage-element read circuit 30. The temperature detector circuit 38 detects the temperature of the encoder 10 and that of the electric motor 28, on the basis of an output from an encoder-temperature detecting element 40 for detecting the temperature of the encoder 10 and an output from a servomotor-temperature detecting element 42 for detecting the temperature of the servomotor 28, and inputs the results of detection to the alarm detector circuit 36. The alarm detector circuit 36 receives, in addition to these temperature-relating signals, output signals from the position-data calculator circuit 16 and the polar-data calculator circuit 34. In some cases, the temperature detector circuit 38 omits the input (shown by a line "A" in FIG. 1) of the detection result to the alarm detector circuit 36.

Based on these input signals, the alarm detector circuit 36 detects whether a malfunction or abnormal state has occurred with relation to one or more check items, and outputs an "alarm" regarding a check item on which a malfunction or abnormal state is detected. The "alarm" includes various types, such as an overheat alarm (a check item is "temperature"), a position alarm (a check item is "position"), and so on. In this connection, the detection of an abnormal state regarding one check item is usually carried out on the basis of the results of judgment made about plural abnormal-state judgment factors set in relation to individual check items. More specifically, a logical sum of the results of judgments made concerning respective abnormal-state Judgment factors is employed, and the data of the logical sum is sent to the numerical control unit 24 through the serial-data transmission/reception control circuit 20 and the transceiver 22. For example, an overheat alarm is output when the result of checking 3 checks item "whether any abnormal state regarding overheat of the encoder 10 or the servomotor 28 appears" is "an abnormal state appears". In this connection, whether "an abnormal state appears" or not is determined on the basis of the results of an abnormal-state judgment regarding the following four abnormal-state judgment factors.

Abnormal-state judgment factor (i) . . . Whether an abnormality in the temperature of the encoder 10 appears. When the temperature exceeds a threshold value, a judgment result (i.e., an output signal) regarding the abnormal-state judgment factor (i) is "1"; and when the temperature does not exceed the threshold value, a judgment result is "0".

Abnormal-state judgment factor (ii) . . . Whether an operational failure or malfunction of the encoder-temperature detecting element 40 appears. When there is no output of a detection signal, or when a signal level is abnormally high (or abnormally low), a judgment result (i.e., an output signal) regarding the abnormal-state judgment factor (ii) is "1" (malfunction); and otherwise, a judgment result is "0".

Abnormal-state judgment factor (iii) . . . Whether an abnormality in the temperature of the servomotor 28 appears. When the temperature exceeds a threshold value, a judgment result (i.e., an output signal) regarding the abnormal-state judgment factor (iii) is "1"; and when the temperature does not exceed the threshold value, a judgment result is "0".

Abnormal-state judgment factor (iv) . . . Whether an operational failure or malfunction of the servomotor-temperature detecting element 42 appears. When there is no output of a detection signal, or when a signal level is abnormally high (or abnormally low), a judgment result (i.e., an output signal) regarding the abnormal-state judgment factor (iv) is "1" (malfunction); and otherwise, a judgment result is "0".

Binary values ("0" or "1") expressing results of judgments respectively made for the above four abnormal-state judgment factors are input to an OR circuit, from which a logical sum of these binary values is output. When the logical sum shows "1", the numerical control unit 24 receives it as overheat-alarm information, carries out an emergency stop of the servomotor 28, and executes an "overheat alarm" display process. In this connection, when "overheat" is included as one of check items, the line A (i.e., the input from the temperature detector circuit 38 to the alarm detector circuit 36) shown in FIG. 1 is not omitted. In the case where the line A is omitted, the alarm detector circuit 36 checks both of the position data (i.e., data regarding the encoder signal [precise]) entered from the position-data calculator circuit 16 and/or the polar data (i.e., data regarding the encoder signal [rough]) entered from the polar-data calculator circuit 34. As a result, it is possible for the alarm detector circuit 36 to output the position alarm (a check item is "whether an abnormal state appears in relation to the encoder signal [precise]") and/or the polar alarm (a check item is "whether an abnormal state appears in relation to the encoder signal [rough]") as the logical sum of the judgment results for the plural abnormal-state judgment factors concerning the respective check items.

In the self-diagnosing system having the above configuration, the data sent from the alarm detector circuit 36 to the numerical control unit 24 are not the judgment result of each of the plural abnormal-state judgment factors, which affects an abnormal-state judgment for each of the various check items, but are the logical sum of these abnormal-state judgment factors. Therefore, it is difficult to specify, in the numerical control unit 24, the cause of the abnormal-state occurrence. For example, when an "overheat alarm" is output, it is not possible to specify any one abnormal-state judgment factor causing the overheat alarm to be output, among the plural (four, in the above example) abnormal-state judgment factors constituting the evidence of abnormal-state judgment. In other words, it is not clear which abnormal-state(s), among the overheat of the encoder 10 itself, the malfunction of the encoder-temperature detecting element 40, the overheat of the servomotor 28 and the malfunction of the servomotor-temperature detecting element 42, is the cause of the "overheat alarm". Also, in this connection, the judgment results for the respective abnormal-state judgment factors are not stored in the system. In other words, no data probably useful for elucidating the cause of the abnormal-state occurrence are transmitted to the numerical control unit 24, or are stored.

As explained above, according to the above configuration, in the case where the encoder 10 falling into an abnormal state is replaced with another one and, at a later date, a specialty division investigates the cause of the abnormal state occurring in this encoder, internal information (i.e., the above-described data of the position, the speed, the temperature, etc.) showing the operation state of the encoder 10 at the time when the abnormal state occurred is not stored in the encoder 10, and therefore it is not easy to investigate the cause of the abnormal-state occurrence. In other words, although the nonvolatile storage element 26 is built into the encoder circuit 12, the nonvolatile storage element 26 is not effectively used to store the internal information of the encoder 10 at the time an abnormal state occurs, and thus it is difficult to accurately specify the cause of the abnormal-state occurrence.

In order to solve the above problem, a self-diagnosing system for an encoder, according to the present invention, is configured to store internal information (i.e., the above-described data of the position, the speed, the temperature, etc.), showing the operation state of an encoder and/or a servomotor at the time of or immediately before the occurrence of an abnormal-state (i.e., at a timing not later than an instant when the abnormal state occurs), into a storage section of the encoder. The configuration of the self-diagnosing system for an encoder, according to the present invention, will be described below with reference to FIGS. 2 to 5.

Figure 2:
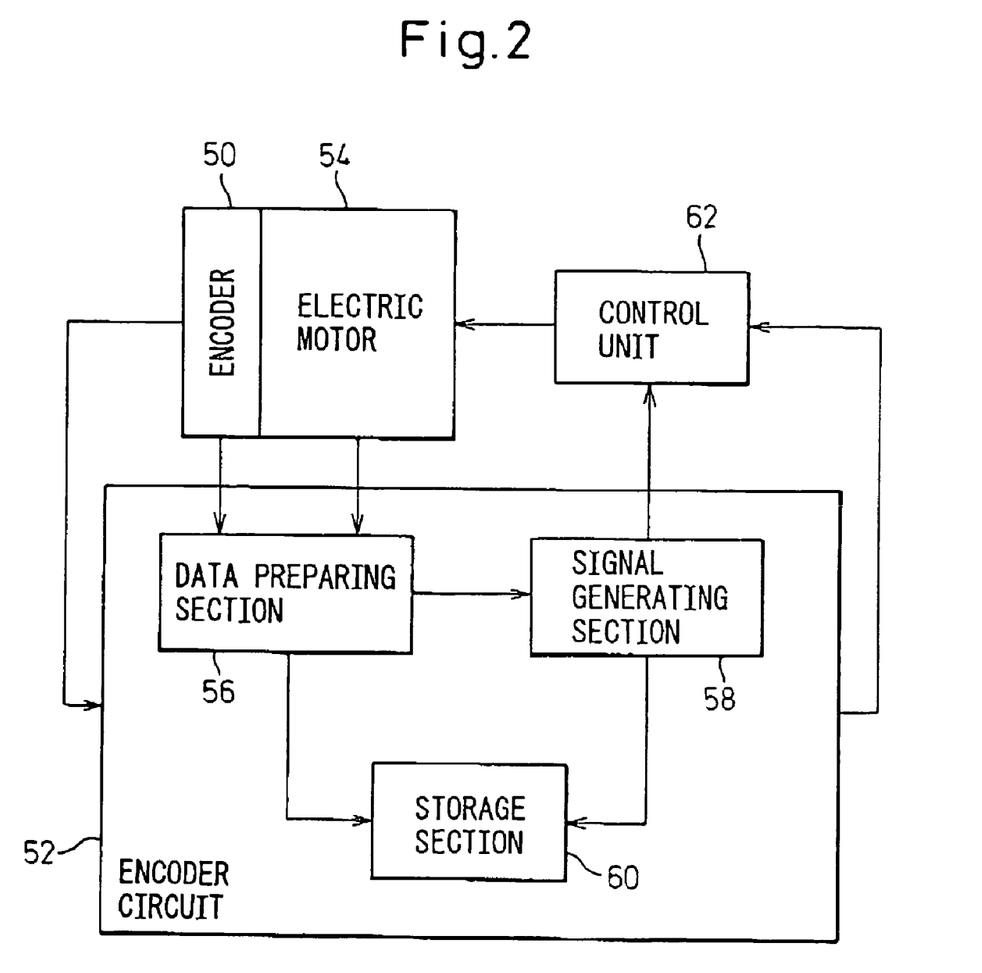
FIG. 2 is a block diagram showing the basic configuration of a self-diagnosing system for an encoder, according to the present invention.

Referring to FIG. 2, as a basic configuration, the self-diagnosing system for an encoder, according to the present invention, includes an encoder circuit 52 for outputting information detected by an encoder 50; a data preparing section 56 provided in the encoder circuit 52 and preparing data representing a state of an abnormal-state judgment factor in connection with at least one of the encoder 50 and an electric motor (or servomotor) 54 combined with the encoder 50; a signal generating section 58 provided in the encoder circuit 52 and generating an abnormal-state signal when the data prepared in the data preparing section 56 represents an abnormal state of the abnormal-state judgment factor; and a storage section 60 provided in the encoder circuit 52 and storing the data representing a state of the abnormal-state judgment factor when the signal generating section 58 generates the abnormal-state signal. In this configuration, the storage section 60 may store the data prepared in the data preparing section 56 at a desired timing not later than an instant when the signal generating section 58 generates the abnormal-state signal. Note that the encoder circuit 52 is a circuit for outputting the position data and/or the speed data of the electric motor 54 detected by the encoder 50 to an external control unit 62, like the encoder circuit 12 explained with reference to FIG. 1. The control unit 62 executes a feedback control for the electric motor 54 on the basis of the data received from the encoder circuit 52.

The configuration of the self-diagnosing system for an encoder, according to a first embodiment of the present invention having the above basic configuration, will be described below with reference to FIG. 3. In the self-diagnosing system according to the first embodiment, the encoder circuit 52 for outputting the information detected by the encoder 50 is provided with an encoder-signal amplifier circuit for position-data 64 incorporating therein an A/D converter or the like, and a position-data calculator circuit 66 connected to the encoder-signal amplifier circuit for position-data 64. The encoder-signal amplifier circuit for position-data 64 is an analog signal circuit for amplifying signals of various phases (A-phase, B-phase, Z-phase, etc.), which are generated when an optical code plate (not shown) of the encoder 10 performs a rotation (in the case of a rotary encoder) or a linear motion (in the case of a linear encoder). The signal amplified in the encoder-signal amplifier circuit for position-data 64 is subjected to processes such as an A/D conversion, and thereafter is input to the position-data calculator circuit 66. The position-data calculator circuit 66 is a circuit for calculating a position (i.e., a rotation position or a linear motion position) on the basis of a known calculation process, and constitutes a part of a logic circuit 68 comprised of an LSI provided in the encoder circuit 52.

The position data calculated by the position-data calculator circuit 66 are input sequentially to a transceiver 72 through a serial-data transmission/reception control circuit 70 provided in the logic circuit 68, in the same way as outputs from other circuits, and are transmitted from the transceiver 72 to a numerical control unit (CNC) 62. The numerical control unit (CNC) 62 carries out a feedback control or the like, on the basis of these position data (or corrected data, if the position data are corrected). In this connection, the position data sent to the numerical control unit (CNC) 62 is corrected or processed, as occasion demands, using data stored in a nonvolatile storage element 74 provided in the encoder circuit 52.

The nonvolatile storage element 74 stores therein roughly-divided two types of information. A first type of information is information mainly used for a feedback control of the electric motor 54, such as ID information (specification data, date of manufacture, the serial number of a unit motor, etc.) of the encoder 50 and the electric motor 54, precision correction data for ensuring the detection precision of the encoder 50, and so on. These items of information are read by a nonvolatile storage element read/write circuit 76 provided in the logic circuit 68, and are used for the calculation (e.g., correction of an error inherent to individual encoders 50) or the data-processing executed in the numerical control unit 62. In the case where speed data is required, the position-data calculator circuit 66 may be changed to a "position data and speed data calculator circuit" for preparing the speed data within the encoder circuit 52, or alternatively, the numerical control unit 62 may prepare the speed data on the basis of the position data.

A second type of information stored in the nonvolatile storage element 74 is various internal information (i.e., the data of position, speed, temperature, etc.) representing the operation state of the encoder 50 and/or the electric motor 54, at the time of or immediately before the occurrence of an abnormal-state (i.e., at a timing not later than the instant the abnormal state occurs) in the encoder 50 and/or the electric motor 54. In this connection, the "internal information" is the information representing an operation state of the encoder 50 and/or the electric motor 54 to be detected by the encoder 50, which changes every moment at least during the operation of the encoder and/or the motor, and includes the above-described data representing a state of an abnormal-state judgment factor. The characteristic configuration of the present invention, in which the "internal information" is stored in the nonvolatile storage element 74, is described in detail later.

The encoder 50 is required to detect a position with as high precision as possible, so that the encoder-signal amplifier circuit for position-data 64 handles a signal having extremely high precision, which is denoted by a suffix [precise] in the drawing. In addition to the circuit 64 for highly precise detection of the position information, the encoder circuit 52 is also provided with an amplifier circuit 78 for outputting an encoder signal for polar-data (which is denoted by a suffix [rough] in the drawing), as a signal representing the position of the motor axis with relatively low precision (i.e., a precision defined by the performance of a rotary encoder sufficient to detect an actual rotation number; or a precision defined by the performance of a linear encoder sufficient to detect a position within one polar-cycle error). The encoder signal for polar-data, output from the amplifier circuit 78, is input to a polar-data calculator circuit 80 in the logic circuit 68. The result of the calculation in the calculator circuit 80 is sent to the numerical control unit (CNC) 62 through the serial-data transmission/reception control circuit 70 and the transceiver 72, in the same way as outputs from other circuits, and is used for, e.g., detection of the total is rotation number of the encoder 50 or the electric motor 54 (in the case of a linear encoder, the total moving distance of the encoder 50 or the linear motor 54).

The logic circuit 18 comprised of the LSI includes an alarm detector circuit 82 and a temperature detector circuit 84, in addition to the position-data calculator circuit 66, the polar-data calculator circuit 30 and the nonvolatile storage element read/write circuit 76. The temperature detector circuit 84 detects the temperature of the encoder 50 and that of the electric motor 54, on the basis of an output from an encoder-temperature detecting element 86 for detecting the temperature of the encoder 50 and an output from a motor-temperature detecting element 88 for detecting the temperature of the electric motor 54, and inputs the results of detection to the alarm detector circuit 82. The alarm detector circuit 82 receives, in addition to these temperature-relating signals, output signals from the position-data calculator circuit 66 and the polar-data calculator circuit 80.

In the above configuration, the encoder-signal amplifier circuit for position-data 64, the position-data calculator circuit 66, the encoder-signal amplifier circuit for polar-data 78, the polar-data calculator circuit 80, the temperature detector circuit 84, the encoder-temperature detecting element 86 and the motor-temperature detecting element 88 correspond to the data preparing section as described (FIG. 2). Also, the alarm detector circuit 82 corresponds to the signal generating section 58 as described (FIG. 2). Also, the nonvolatile storage element 74 and the nonvolatile storage element read/write circuit 76 correspond to the storage section 60 as described (FIG. 2).

Based on the above-described various input signals, the alarm detector circuit 82 detects whether a malfunction or abnormal state occurs with relation to one or more check items, and outputs an "alarm" regarding a check item on which a malfunction or abnormal state is detected. As explained with reference to FIG. 1, the check items correspond to the types of alarm (i.e., overheat alarm, position alarm, etc.), and a result of detecting each check item is output as "1" (an abnormal state appears) or "0" (no abnormal state). When the alarm detector circuit 82 outputs "1" in connection with a certain check item, it is considered that an alarm signal (i.e., an abnormal-state signal) for this check item is issued to the numerical control unit 62. The detecting result of each check item, which is "1" or "0", depends on whether an abnormal state appears in the abnormal-state judgment factor relating to this check item. Usually, plural abnormal-state judgment factors are set for one check item. When an abnormal state appears in at least one of these abnormal-state judgment factors, the output regarding the check item is "1" (an abnormal state appears). More specifically, a logical sum of signals, respectively representing a result of judgments made about respective abnormal-state judgment factors, is sent to the numerical control unit 62 through the serial-data transmission/reception control circuit 70 and the transceiver 72. If the logical sum is "1", it is considered that the alarm signal is output.

On the other hand, when an alarm signal is output from the alarm detector circuit 82 (i.e., when the judgment result of an abnormal state regarding at least one abnormal-state judgment factor is "an abnormal state appears"), the above-described various internal information (including the data representing the states of respective abnormal-state judgment factors), at the time of outputting the signal or at a timing before outputting the signal by a predetermined time, are written into the nonvolatile storage element 74 through the nonvolatile storage element read/write circuit 76. These items of internal information are the following data or signal sent along lines "B", "C", "D" and "E" shown in the block diagram of FIG. 3:

Line B . . . An alarm signal (i.e., data representing the output of an alarm signal from the alarm detector circuit 82);

Line C . . . Temperature data (i.e., data representing the temperatures of the encoder 50 and the electric motor 54, detected in the temperature detector circuit 84);

Line D . . . Position data and/or speed data (i.e., data calculated in the position-data calculator circuit 66 and/or the polar-data calculator circuit 80); and Line E . . . Abnormal-state decision evidential data (i.e., data representing evidence of generation of the alarm signal from the alarm detector circuit 82, and adapted to be used as a basis of the temperature data or the position/speed data prepared in the data preparing section 56 (i.e., the above-described various circuits), which more directly represents the situation of each part of the system (i.e., the encoder 50, the electric motor 54, the encoder-temperature detecting element 86 and the motor-temperature detecting element 88)).

Along the line B from the alarm detector circuit 82, information representing the detection results regarding respective check items is sent, together with the alarm signal, to the nonvolatile storage element read/write circuit 76. This information is then written into the nonvolatile storage element 74. The configuration of the alarm detector circuit 82 will be described with reference to FIG. 4. In FIG. 4, bits represent the states of various check items corresponding to the types of alarm are denoted by "b2", "b1" and "b0". For example, the bit b2 corresponds to "overheat alarm", the bit b1 corresponds to "position alarm", and the bit b0 corresponds to "polar alarm". Although, in the illustrated example, the types of alarm (i.e., the number of bits) are three, a few to several dozens of bits are generally prepared.

As illustrated, the alarm detector circuit 82 is provided with a plurality of binary inputs (corresponding to abnormal-state judgment factors), that are grouped into the respective types of alarm (corresponding to the check items). Therefore, the binary value (i.e., a detection result) of each of the bits b2, b1 and b0 is determined by the logical sum of the binary inputs in each group. In the illustrated example, a logic circuit is configured in such a manner that the binary value of the bit b2 is determined by the logical sum of four binary inputs [b2-1], [b2-2], [b2-3] and [b2-4]. In the same way, the binary value of the bit b1 is determined by the logical sum of two binary inputs [b1-1] and [b1-2], and the binary value of the bit b0 is determined by the logical sum of two binary inputs [b0-1] and [b0-2]. The number of binary inputs prepared for each type (or bit) of alarms is not limited to the number as illustrated.

In the case where the bits b2, b1 and b0 correspond respectively to the "overheat alarm", the "position alarm" and the "polar a arm" as described above, the binary inputs [b2-1] to [b0-2] in connection with these bits may be comprised of, e.g., the signals representing the states (normal or abnormal) of the abnormal-state judgment factors, as follows.

I) Input signals affecting the value of the bit b2 (the bit of overheat alarm):

[b2-1] . . . An input signal corresponding to the abnormal-state judgment factor (i) as already described, and representing whether the temperature abnormality of the encoder 50 appears. When the temperature exceeds a threshold value, the input signal is a binary signal of a value "1"; and when the temperature does not exceed the threshold value, the input signal is a binary signal of a value "0".

[b2-2] ... An input signal corresponding to the abnormal-state judgment factor (ii) as already described, and representing whether the operational failure or malfunction of the encoder-temperature detecting element 86 appears. When there is no output of a detection signal, or when a signal level is abnormally high (or abnormally low), the input signal is a binary signal of a value "1" (malfunction); and otherwise, the input signal is a binary signal of a value "0".

[b2-3] ... An input signal corresponding to the abnormal-state judgment factor (iii) as already described, and representing whether the temperature abnormality of the electric motor 54 appears. When the temperature exceeds a threshold value, the input signal is a binary signal of a value "1"; and when the temperature does not exceed the threshold value, the input signal is a binary signal of a value "0".

[b2-4] ... An input signal corresponding to the abnormal-state judgment factor (iv) as already described, and representing whether the operational failure or malfunction of the motor-temperature detecting element 88 appears. When there is no output of a detection signal, or when a signal level is abnormally high (or abnormally low), the input signal is a binary signal of a value "1" (malfunction); and otherwise, the input signal is a binary signal of a value "0".

As illustrated, the value of the bit b2 is comprised of the logical sum of these four input signals. In other words, if at least one of [b2-1] to [b2-4] is "1", the value of the bit b2 is "1", and if all or [b2-1] to [b2-4] are "0", the value of the bit b2 is "0".

II) Input signals affecting the value of the bit b1 (the bit of position alarm):

(b1-1) ... An input signal representing whether the operational failure or malfunction of the detection signal generating section of the encoder 50 (e.g., a trouble in a light source or an optical detector, in the case of an optical encoder) appears. When the calculation result in the position-data calculator circuit 66 shows the malfunction, the input signal is a binary signal of a value "1"; and otherwise, the input signal is a binary signal of a value "0".

[b1-2] ... An input signal representing whether the abnormality in position data detected by the encoder 50 appears (e.g., an unrealistic value appears in an axis driven by the electric motor 54). When the calculation result in the position-data calculator circuit 66 shows the position-data abnormality, the input signal is a binary signal of a value "1"; and otherwise, the input signal is a binary signal of a value "0".

As illustrated, the value of the bit b1 is comprised of the logical sum of these two input signals. In other words, if at least one of [b1-1] and [b1-2] is "1", the value of the bit b1 is "1", and if both of [b1-1] and [b1-2] are "0", the value of the bit b1 is "0".

III) Input signals affecting the value of the bit b0 (the bit of polar alarm):

[b0-1] ... An input signal representing whether the operational failure or malfunction of the polar signal generating section of the encoder 50 (e.g., a trouble in a light source or an optical detector in a single-rotation signal generating section, in the case of an optical encoder) appears. When the calculation result in the polar-data calculator circuit 80 shows the malfunction, the input signal is a binary signal of a value "1"; and otherwise, the input signal is a binary signal of a value "0".

[b0-2] ... An input signal representing whether the abnormality in polar data detected by the encoder 50 appears (e.g., an unrealistic value appears in an axis driven by the electric motor 54). When the calculation result in the polar-data calculator circuit 80 shows the polar-data abnormality, the input signal is a binary signal of a value "1"; and otherwise, the input signal is a binary signal of a value "0".

As illustrated, the value of the bit b0 is comprised of the logical sum of these two input signals. In other words, if at least one of [b0-1] and [b0-2] is "1", the value of the bit b0 is "1", and if both of [b0-1] and [b0-2] are "0", the value of the bit b0 is "0".

Figure 3:
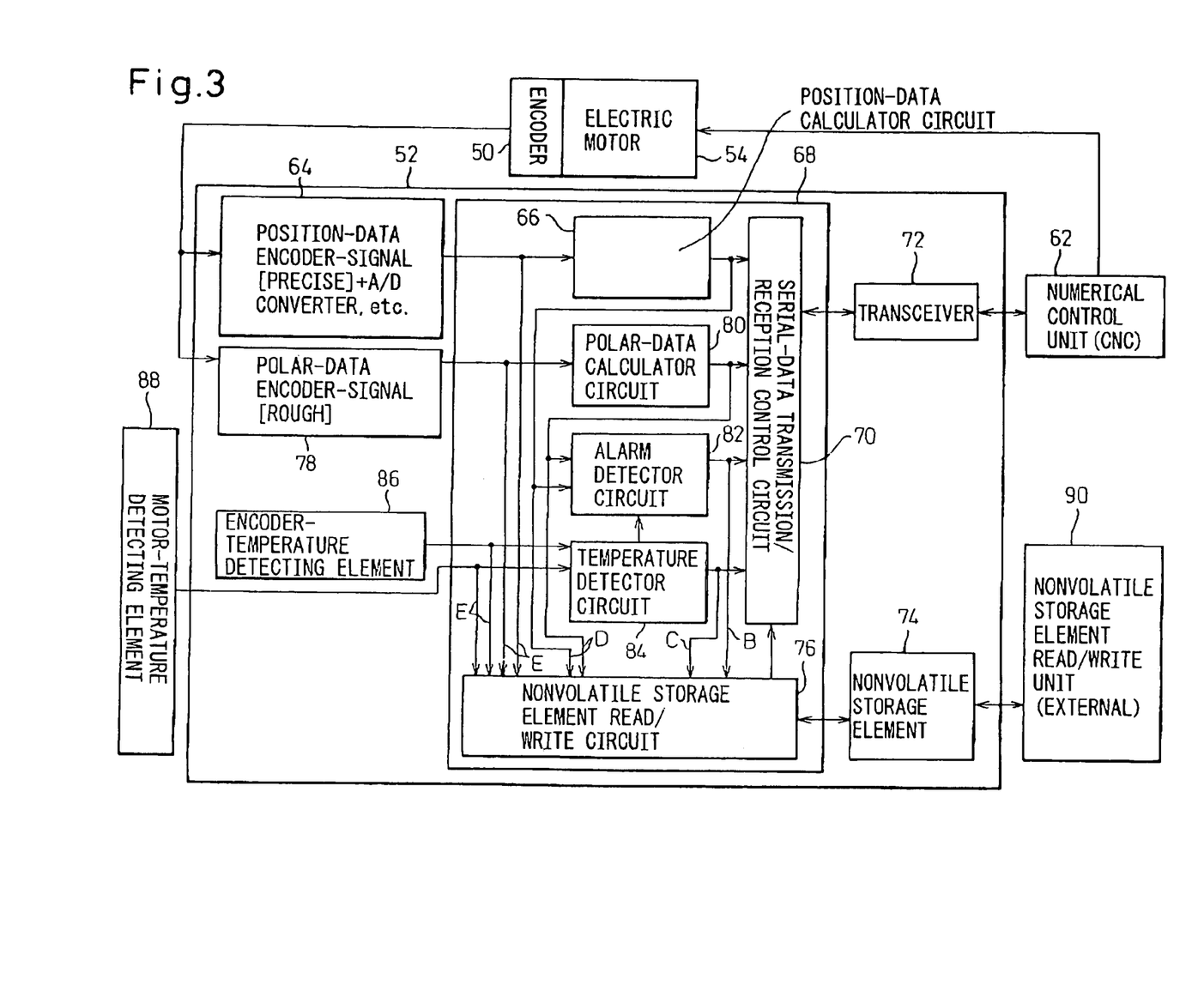
FIG. 3 is a circuit block diagram showing the configuration of a self-diagnosing system for an encoder, according to a first embodiment of the present invention.
Figure 4:
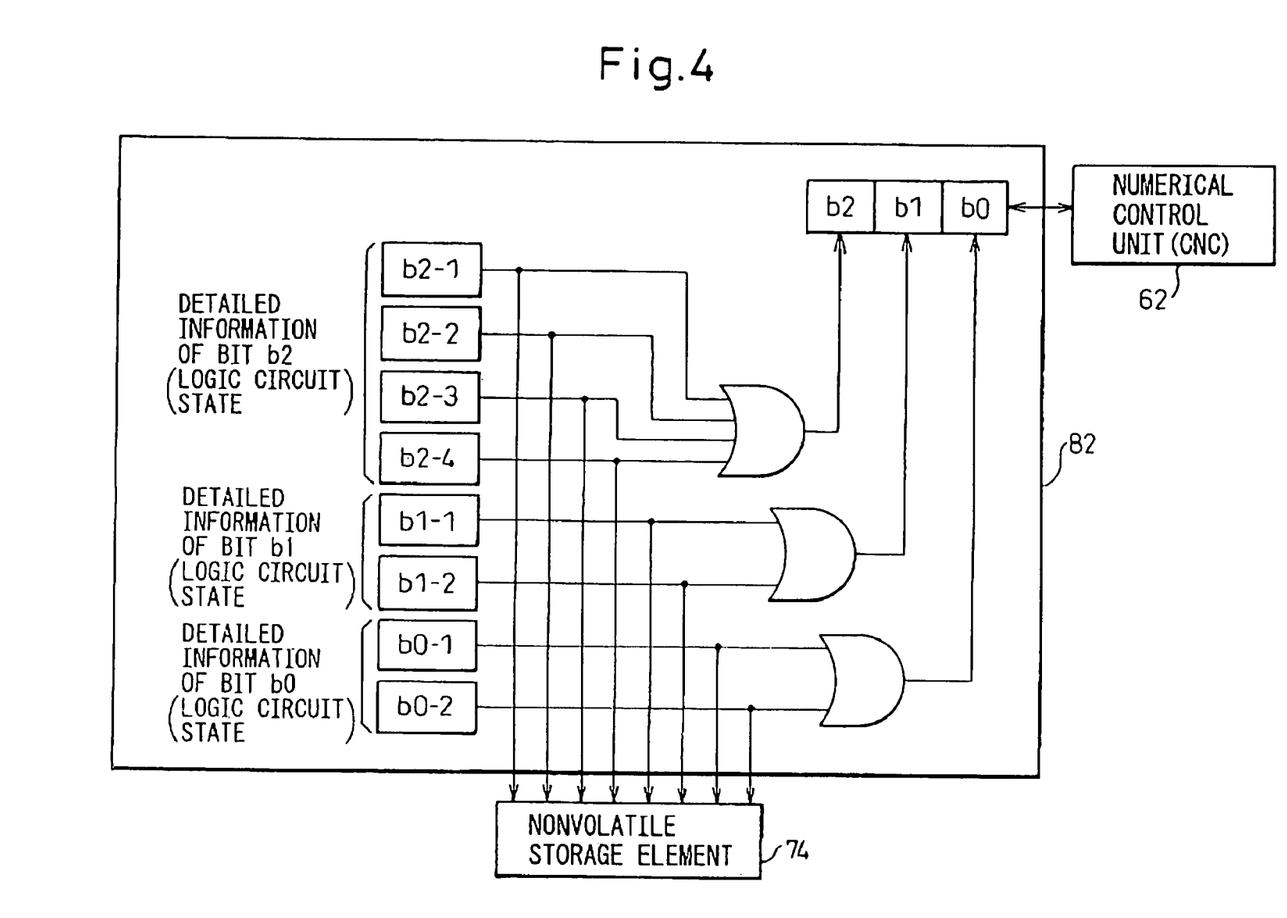
FIG. 4 is a diagram showing an example of the configuration of an alarm detector circuit used in the self-diagnosing system of FIG. 3.

After the values of the bits b2, b1 and b0 corresponding to the types of alarm are determined in a manner as described above, the alarm detector circuit 82 sends the values of the bits b2, b1 and b0 to the numerical control unit 62 through the serial-data transmission/reception control circuit 70 and the transceiver 72 (FIG. 3). The numerical control unit 62 receives the signal (i.e., the alarm signal) of a bit showing "1", among the bits b2, b1 and b0, as alarm information of a type corresponding to the bit. In this connection, the numerical control unit 62 recognizes only the values of the bits b2, b1 and b0 (i.e., the logical sums of the respective input signals).

Therefore, in the case where the bit b2 takes a value "1", for example, the numerical control unit 62 can recognize the "overheat alarm" as already described, but it is difficult in the numerical control unit 62 to specify which (one or more) abnormal-state judgment factor is the cause of this alarm, among the above-described four abnormal-state judgment factors, i.e., "the temperature abnormality of the encoder 50", "the operational failure of the encoder-temperature detecting element 86", "the temperature abnormality of the electric motor 54" and "the operational failure of the motor-temperature detecting element 88".

In this situation, the present embodiment is configured such that, as already described, when the alarm detector circuit 82 detects a certain abnormal state (i.e., when the alarm detector circuit 82 generates an alarm signal), the information of "overheat alarm", "position alarm" and/or "polar alarm" is transmitted to the numerical control unit 62 through the serial-data transmission/reception control circuit 70, and, within the encoder circuit 52, the various internal information as described, including the alarm signal, are automatically written into the nonvolatile storage element 74. In this connection, the internal information stored in the nonvolatile storage element 74 is the data or signal sent along the lines B to E. The data sent along the line B includes data showing the results of judgments made about the plural abnormal-state judgment factors in connection with respective check items. In the example shown in FIG. 4, the data showing the judgment results regarding the abnormal-state judgment factors are the values ("0" or "1") of the input signals [b2-1], [b2-2], [b2-3], [b2-4], [b1-1], [b1-2], [b0-1] and [b0-2], and these values are stored in the nonvolatile storage element 74.

Figure 5:
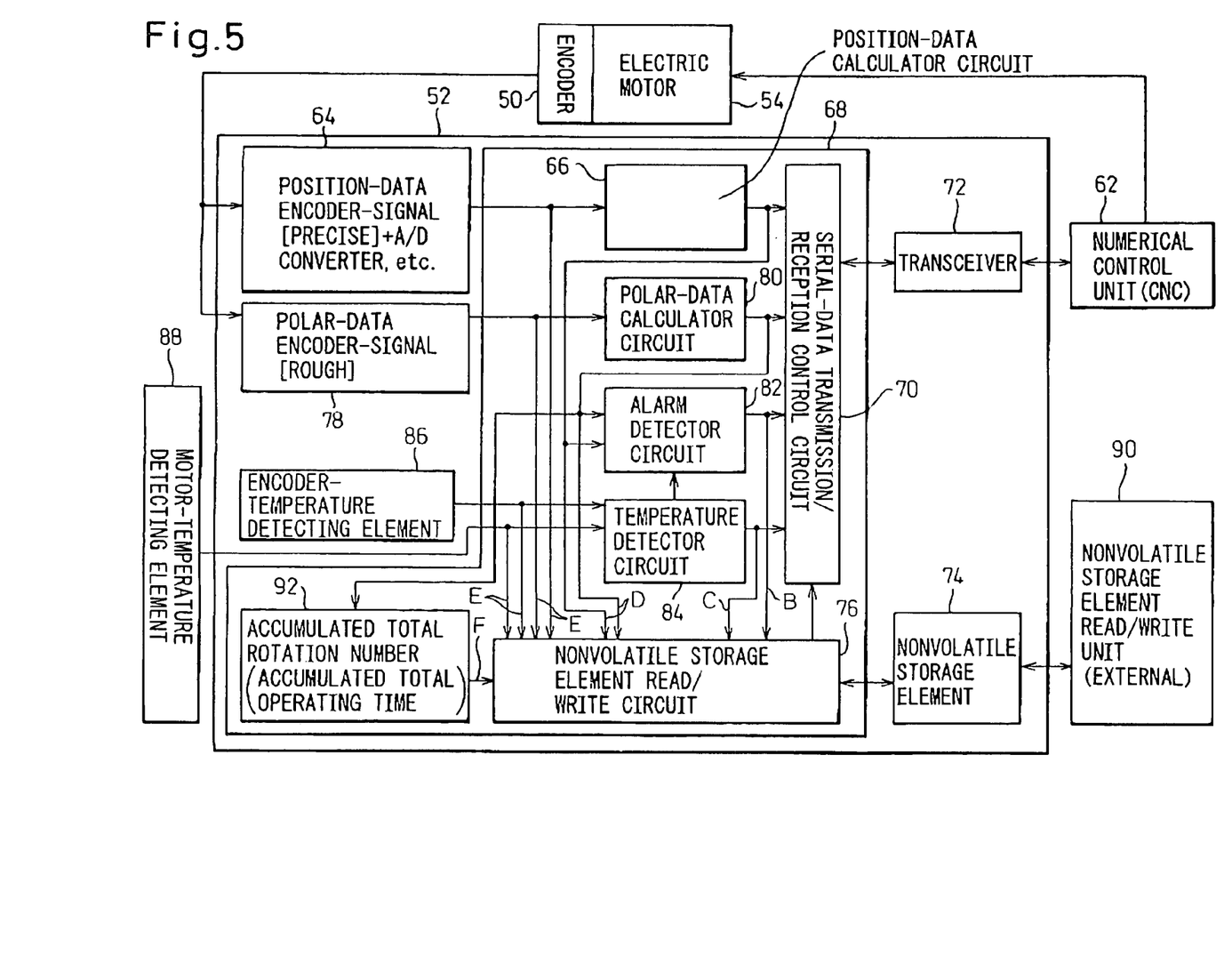
FIG. 5 is a circuit block diagram showing the configuration of a self-diagnosing system for an encoder, according to a second embodiment of the present invention.

It is possible to read, as occasion demands, the internal information stored, in the above manner, in the nonvolatile storage element 74 within the encoder circuit 52 at the time when an abnormal state occurs, by using an external nonvolatile storage element read/write unit 90 (shown in FIG. 5). For example, in the case where the encoder 50 falling into an abnormal state is detached from the motor for the investigation by a specialty division at a later date, it is possible to read out the internal information stored in the nonvolatile storage element 74 by connecting the nonvolatile storage element read/write unit 90 to the nonvolatile storage element 74. Although not shown, when the internal information as read is displayed in a display unit or printed by a printer, it is possible to obtain more detailed information that is not clarified in the alarm information in the numerical control unit 62.

For example, when the "overheat alarm" is output from the encoder circuit 52, it is possible to specify, from the information stored in the nonvolatile storage element 74, which (one or more) is the cause of this alarm, among "the temperature abnormality of the encoder 50", "the operational failure of the encoder-temperature detecting element 86", "the temperature abnormality of the electric motor 54" and "the operational failure of the motor-temperature detecting element 88". Further, in this case, it is possible to read and confirm, from the nonvolatile storage element 74, the temperature data of the encoder 50 and the electric motor 54 output from the temperature detector circuit 84, as well as the evidential data directly representing the situations of the encoder-temperature detecting element 86 and the motor-temperature detecting element 88, at the time of occurrence of the abnormal state or at a timing before occurrence of the abnormal state by a predetermined time (i.e., at a desired timing not later than the instant the alarm detector circuit 82 generates an alarm signal). Therefore, the cause of the abnormal-state occurrence can be specified more easily and accurately.

Similarly, when the "position alarm" or the "polar alarm" is output, it is possible to read, from the nonvolatile storage element 74, the states (i.e., values "0" or "1") of the input signals [b1-1] and [b1-2], or [b0-1] and [b0-2], representing the results of judgments made about the abnormal-state judgment factors corresponding to the alarm. Further, in this case, it is possible to read and confirm, from the nonvolatile storage element 74, the position data calculated by the position-data calculator circuit 66 or the polar data calculated by the polar-data calculator circuit 80, as well as the evidential data directly representing the situations of the encoder 50 and the electric motor 54, at the time of occurrence of the abnormal state or at a timing before occurrence of the abnormal state by a predetermined time. Therefore, the cause of the abnormal-state occurrence can be specified more easily and accurately.

FIG. 5 shows a self-diagnosing system for an encoder, according to a second embodiment of the present invention. The self-diagnosing system of this embodiment is configured such that, in addition to the above-described configuration of the self-diagnosing system of the first embodiment, it is possible to further store the information concerning the life of the encoder in the nonvolatile storage element. Therefore, corresponding components are denoted by common reference numerals, and the description thereof is not repeated.

As shown in FIG. 5, the encoder circuit 52 according to the second embodiment is further provided with an accumulated total rotation-number counter circuit 92 provided in the logic circuit 68, as a moving-distance measuring section measuring an accumulated total moving distance of the encoder 50. The accumulated total rotation-number counter circuit 92 accumulatively counts the total rotation number of the encoder 50 during a period from the initial use thereof, on the basis of the polar data output from the polar-data calculator circuit 30. The total rotation-number data counted in the accumulated total rotation-number counter circuit 92 is sent to the nonvolatile storage element read/write circuit 76 (along a line F) and is written into the nonvolatile storage element 74, at the time an abnormal state is detected, as one of the above-described internal information at a desired timing not later than the instant an abnormal-state is detected (i.e., the instant the alarm detector circuit 82 generates the alarm signal). Other configurations of the encoder circuit 52 are the same as those according to the first embodiment.

In the above configuration, the accumulated total rotation-number counter circuit 92 may be changed to the accumulated total operating-time counter circuit 92 (or alternatively, a time count function may be added to the number count function). In this arrangement, the accumulated total operating-time counter circuit 92 accumulatively counts the total operating time of the encoder 50 during a period from the initial use thereof (i.e., the time of switched-on state of the power source of the encoder), on the basis of the polar data output from the polar-data calculator circuit 80. The total operating-time data counted in the accumulated total operating-time counter circuit 92 is written into the nonvolatile storage element 74 through the nonvolatile storage element read/write circuit 76, at the time an abnormal state is detected, as one of the above-described internal information.

In the above second embodiment, the information stored in the nonvolatile storage element 74 (i.e., the total rotation-number data and/or the total operating-time data) is useful information for judging whether an abnormal state, occurring in the encoder 50 or the electric motor 54, is as a result the end of life of the encoder 50. For example, in the case where the above-described input signal [b1-1] of the alarm detector circuit 82 is "1" and a position alarm is thus output in the bit b1, if the total rotation-number data or the total operating-time data, stored in the nonvolatile storage element 74, indicate the end of life of the encoder 50 (e.g., the fact that the total rotation number of the data far exceeds a rated total rotation number), it is possible to judge that the alarm is based on "an abnormal state resulting from the end of life", and otherwise, that the alarm is based on another cause (i.e., the operational failure of the detection signal generating section of the encoder 50).

In the configuration of the second embodiment, if the encoder 50 is a linear encoder, the moving-distance measuring section may be configured by an accumulated total moving-distance measuring circuit 92. In this case, in place of the total rotation-number data, it is possible to store the total moving-distance data of the linear encoder in the nonvolatile storage element 74. Although, in the above-described first and the second embodiments, the nonvolatile storage element 74 is employed as the storage section 60 provided in the encoder circuit 52, a volatile storage element may also be employed, provided that a backup power source (e.g., an integrated battery) is provided for the encoder circuit 52.

As is apparent from the above description, according to the present invention, it is possible, at the time of maintenance or checking of the encoder 50, to confirm the operation state of the encoder 50 and/or the electric motor 54 at the instant an abnormal state occurs therein, and therefore to easily specify the cause of the abnormal-state occurrence, which improves maintenance characteristics. Also, it is easy to take countermeasures against the abnormal-state occurrence, which significantly improves the reliability of the encoder 50.

While the invention has been described with reference to specific preferred embodiments, it will be understood by those skilled in the art that various changes and modifications may be made thereto without departing from the spirit and scope of the following claims.

The invention claimed is:

1. A self-diagnosing system for an encoder, comprising:
an encoder circuit for outputting information detected by an encoder;

a data preparing section provided in said encoder circuit, said data preparing section preparing data representing a state of an abnormal-state judgment factor in connection with at least one of the encoder and an electric motor combined with the encoder;

a signal generating section provided in said encoder circuit, said signal generating section generating an abnormal-state signal when said data prepared in said data preparing section represents an abnormal state of said abnormal-state judgment factor; and a storage section provided in said encoder circuit, said storage section storing said data representing a state of said abnormal-state judgment factor when said signal generating section generates said abnormal-state signal;

wherein said storage section stores said data prepared in said data preparing section at a desired timing not later than an instant said signal generating section generates said abnormal-state signal.

2. A self-diagnosing system for an encoder, comprising:

an encoder circuit for outputting information detected by an encoder;

a data preparing section provided in said encoder circuit, said data preparing section preparing data representing a state of an abnormal-state judgment factor in connection with at least one of the encoder and an electric motor combined with the encoder;

a signal generating section provided in said encoder circuit, said signal generating section generating an abnormal-state signal when said data prepared in said data preparing section represents an abnormal state of said abnormal-state judgment factor; and a storage section provided in said encoder circuit, said storage section storing said data representing a state of said abnormal-state judgment factor when said signal generating section generates said abnormal-state signal;

wherein said data preparing section prepares plural pieces of data respectively representing states of plural abnormal-state judgment factors set in connection with predetermined check items for the at least one of the encoder and the electric motor; wherein said signal generating section generates said abnormal-state signal when at least one of said plural pieces of data prepared in said data preparing section represents an abnormal state in said abnormal-state judgment factor corresponding thereto; and wherein said storage section stores said plural pieces of data respectively representing states of said plural abnormal-state judgment factors when the signal generating section generates said abnormal-state signal.

3. A self-diagnosing system for an encoder, comprising:

an encoder circuit for outputting information detected by an encoder;

a data preparing section provided in said encoder circuit, said data preparing section preparing data representing a state of an abnormal-state judgment factor in connection with at least one of the encoder and an electric motor combined with the encoder;

a signal generating section provided in said encoder circuit, said signal generating section generating an abnormal-state signal when said data prepared in said data preparing section represents an abnormal state of said abnormal-state judgment factor; and a storage section provided in said encoder circuit, said storage section storing said data representing a state of said abnormal-state judgment factor when said signal generating section generates said abnormal-state signal;

wherein said data prepared in said data preparing section includes at least one of:

data representing said state of said abnormal-state judgment factor in terms of a position of the electric motor detected by the encoder;

data representing said state of said abnormal-state judgment factor in terms of a speed of the electric motor detected by the encoder;

data representing said state of said abnormal-state judgment factor in terms of a temperature of the encoder; and data representing said state of said abnormal-state judgment factor in terms of a temperature of the electric motor.

4. A self-diagnosing system for an encoder, comprising:

an encoder circuit for outputting information detected by an encoder;

a data preparing section provided in said encoder circuit, said data preparing section preparing data representing a state of an abnormal-state judgment factor in connection with at least one of the encoder and an electric motor combined with the encoder;

a signal generating section provided in said encoder circuit, said signal generating section generating an abnormal-state signal when said data prepared in said data preparing section represents an abnormal state of said abnormal-state judgment factor; and a storage section provided in said encoder circuit, said storage section storing said data representing a state of said abnormal-state judgment factor when said signal generating section generates said abnormal-state signal;

wherein said storage section further stores evidential data representing evidence of generation of said abnormal-state signal, when said signal generating section generates said abnormal-state signal, said evidential data being used as a basis of said data prepared in said data preparing section.

5. A self-diagnosing system for an encoder, comprising:

an encoder circuit for outputting information detected by an encoder;

a data preparing section provided in said encoder circuit, said data preparing section preparing data representing a state of an abnormal-state judgment factor in connection with at least one of the encoder and an electric motor combined with the encoder;

a signal generating section provided in said encoder circuit, said signal generating section generating an abnormal-state signal when said data prepared in said data preparing section represents an abnormal state of said abnormal-state judgment factor; and a storage section provided in said encoder circuit, said storage section storing said data representing a state of said abnormal-state judgment factor when said signal generating section generates said abnormal-state signal;

a moving-distance measuring section provided in said encoder circuit, said moving-distance measuring section measuring an accumulated total moving distance of the encoder, wherein said storage section further stores said accumulated total moving distance measured in said moving-distance measuring section when said signal generating section generates said abnormal-state signal.

6. A self-diagnosing system for an encoder, comprising:

an encoder circuit for outputting information detected by an encoder;

a data preparing section provided in said encoder circuit, said data preparing section preparing data representing a state of an abnormal-state judgment factor in connection with at least one of the encoder and an electric motor combined with the encoder;

a signal generating section provided in said encoder circuit, said signal generating section generating an abnormal-state signal when said data prepared in said data preparing section represents an abnormal state of said abnormal-state judgment factor; and a storage section provided in said encoder circuit, said storage section storing said data representing a state of said abnormal-state judgment factor when said signal generating section generates said abnormal-state signal;

an operating-time measuring section provided in said encoder circuit, said operating-time measuring section measuring an accumulated total operating time of the encoder, wherein said storage section further stores said accumulated total operating time measured in said operating-time measuring section when said signal generating section generates said abnormal-state signal.

* * * * *